US010200969B2

(12) United States Patent
Gudivada et al.

(10) Patent No.: US 10,200,969 B2
(45) Date of Patent: Feb. 5, 2019

(54) METHODS AND APPARATUS FOR SELECTIVELY PROVIDING ALERTS TO PAIRED DEVICES

(71) Applicant: QUALCOMM Incorporated, San Diego, CA (US)

(72) Inventors: Naga Chandan Babu Gudivada, Hyderabad (IN); Surendra Kompala, Hyderabad (IN); Anand Krishna Puranik, Hyderabad (IN); Tushar Gupta, Kanpur (IN); Vishnu Vardhan Kasilya Sudarsan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/591,029

(22) Filed: May 9, 2017

(65) Prior Publication Data
US 2018/0332559 A1 Nov. 15, 2018

(51) Int. Cl.
H04W 68/00 (2009.01)
H04W 12/02 (2009.01)
H04L 29/12 (2006.01)
H04W 4/80 (2018.01)

(52) U.S. Cl.
CPC ....... H04W 68/005 (2013.01); H04L 61/1594 (2013.01); H04W 4/80 (2018.02); H04W 12/02 (2013.01)

(58) Field of Classification Search
CPC ... H04W 68/005; H04W 4/008; H04W 12/02; H04L 61/1594

USPC ........... 455/412.1–414.2, 418–422.1, 456.1, 455/456.2, 457, 41.1–41.2, 552.1
See application file for complete search history.

(56) References Cited

U.S. PATENT DOCUMENTS

| 5,033,076 | A | * | 7/1991 | Jones | H04M 1/663 |
| | | | | | 379/142.02 |
| 6,073,023 | A | | 6/2000 | Tirabassi et al. | |
| 6,377,794 | B2 | * | 4/2002 | Takahashi | H04M 1/57 |
| | | | | | 379/142.01 |
| 6,385,446 | B2 | | 5/2002 | Palviainen et al. | |
| 6,587,683 | B1 | | 7/2003 | Chow et al. | |
| 7,218,924 | B2 | * | 5/2007 | McArdle | H04W 4/16 |
| | | | | | 379/210.02 |
| 7,890,135 | B2 | * | 2/2011 | Eckhart | G06F 21/62 |
| | | | | | 455/410 |

(Continued)

Primary Examiner — Babar Sarwar
(74) Attorney, Agent, or Firm — Arent Fox, LLP

(57) ABSTRACT

Various features related to selectively forwarding alerts/notifications for communications received at a first device to a paired device based on a user's privacy settings, are described. In an aspect of the disclosure, a method and an apparatus are provided. The apparatus maybe a first device, e.g., a UE, including at least one processor. In some configurations, the at least one processor is configured to receive a communication, and determine whether the communication is from a contact associated with a restricted group. The at least one processor maybe further configured to perform, based on the determining, one of: blocking an alert corresponding to the communication from being forwarded to a second device, or forwarding the alert corresponding to the communication to the second device. The second device maybe one of a wearable device, a car infotainment unit, a home entertainment unit, or a business conferencing unit, paired with the first device.

27 Claims, 7 Drawing Sheets

(56) References Cited

U.S. PATENT DOCUMENTS

| | | | |
|---|---|---|---|
| 7,957,721 B2* | 6/2011 | Hogan | H04W 48/16 455/411 |
| 8,621,023 B2 | 12/2013 | Gupta | |
| 8,868,046 B2* | 10/2014 | Fernicola | H04W 4/023 455/413 |
| 9,277,379 B2 | 3/2016 | Fan et al. | |
| 9,374,379 B1* | 6/2016 | Hew | H04L 63/108 |
| 9,603,123 B1* | 3/2017 | Jackson | H04M 1/72569 |
| 2003/0162530 A1* | 8/2003 | Morota | H04M 1/677 455/414.1 |
| 2004/0203601 A1* | 10/2004 | Morriss | G08B 13/1418 455/411 |
| 2004/0264681 A1* | 12/2004 | Silver | H04M 1/57 379/373.01 |
| 2005/0096093 A1* | 5/2005 | Schnurr | H04L 51/066 455/566 |
| 2007/0037562 A1* | 2/2007 | Smith-Kerker | H04M 3/465 455/418 |
| 2007/0136466 A1* | 6/2007 | Etelapera | G06F 3/1454 709/225 |
| 2008/0148154 A1* | 6/2008 | Burrell | H04L 12/1895 715/733 |
| 2009/0086938 A1* | 4/2009 | Ushida | H04M 1/2473 379/93.01 |
| 2010/0075634 A1* | 3/2010 | Miller | H04M 1/663 455/411 |
| 2011/0257973 A1* | 10/2011 | Chutorash | G01C 21/3661 704/235 |
| 2012/0077467 A1* | 3/2012 | Fan | H04W 4/12 455/414.1 |
| 2012/0183221 A1* | 7/2012 | Alasry | G10L 15/06 382/181 |
| 2013/0160049 A1* | 6/2013 | Yamauchi | H04N 21/235 725/32 |
| 2014/0241517 A1* | 8/2014 | Varoglu | H04L 12/587 379/201.01 |
| 2014/0244714 A1* | 8/2014 | Heiby | H04L 51/24 709/203 |
| 2014/0248852 A1* | 9/2014 | Raleigh | H04M 15/723 455/407 |
| 2016/0127534 A1* | 5/2016 | Celik | H04M 1/72552 455/566 |
| 2017/0251097 A1* | 8/2017 | Jackson | H04M 1/72569 |

* cited by examiner

METHODS AND APPARATUS FOR SELECTIVELY PROVIDING ALERTS TO PAIRED DEVICES

FIELD

The present disclosure relates generally to communication devices, and more particularly, to methods and apparatus for controlling routing, e.g., forwarding, of alerts from a communication device to a paired device based on a user's privacy settings.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often utilized when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

In a communication system including a first communication device such as a cell phone, paired with another device such as a Bluetooth headset, when a received communication is detected on the first device, a notification corresponding to the received communication is automatically forwarded to the paired device. In many scenarios, the received communication may be sensitive, e.g., a call/message from a confidential contact and/or from a personal contact, and seamless routing of the communication and/or the notification corresponding to the communication to the paired device may be undesirable from a privacy standpoint of a user of the first device. For example, if a user's phone is paired with a car infotainment system which may include a display, notification for all incoming calls are transparently routed to the paired device. If friends/business peers are in same car, all of them may be able to see the incoming call notifications. In another example, where the user's cell phone is paired with a tablet device, all the notifications are routed to the tablet device causing privacy issues to the user when the tablet is accessed by friends, members of the household and/or others in the presence of the user.

In view of the above, there is need for methods and apparatus for selectively forwarding received communications and/or alerts corresponding to received communications from a communication device to a paired device based on a user's privacy settings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various features related to selectively forwarding alerts/notifications for communications received at a first device to a paired device based on a user's privacy settings are described. Various aspects related to controlling routing, e.g., forwarding, of an ongoing communication, e.g., an active voice call which may have started before the pairing of devices, from the first device to the paired device based on the privacy settings are also described. Various features described herein are well suited for use by communication devices which may be paired with, e.g., communicatively coupled/connected to, a variety of pairable/pairing devices such as car infotainment units, home entertainment systems, wearable devices etc. A wearable device may be any of a variety of devices, such as a Smartwatch, wireless or wired headset, wireless or wired earpiece unit etc., which have the capability to be paired with another device using any of a variety of communications protocols.

In an aspect of the disclosure, a method, a computer-readable medium, and an apparatus are provided. The apparatus may be a first device, e.g., a user equipment (UE). In one configuration, the first device includes a display, at least one processor and a memory coupled to the at least one processor. In another configuration, the at least one processor is configured to receive a communication, and determine whether the communication is from a contact associated with a restricted group. The at least one processor may be further configured to perform, based on the determining, one of: blocking an alert corresponding to the communication from being forwarded to a second device, or forwarding the alert corresponding to the communication to the second device. The second device may be a device that can be communicatively paired, e.g., tethered, with the first device. In some aspects, the second device may be one of a wearable pairing device a car infotainment unit, a home entertainment unit, or a business conferencing unit, paired with the first device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
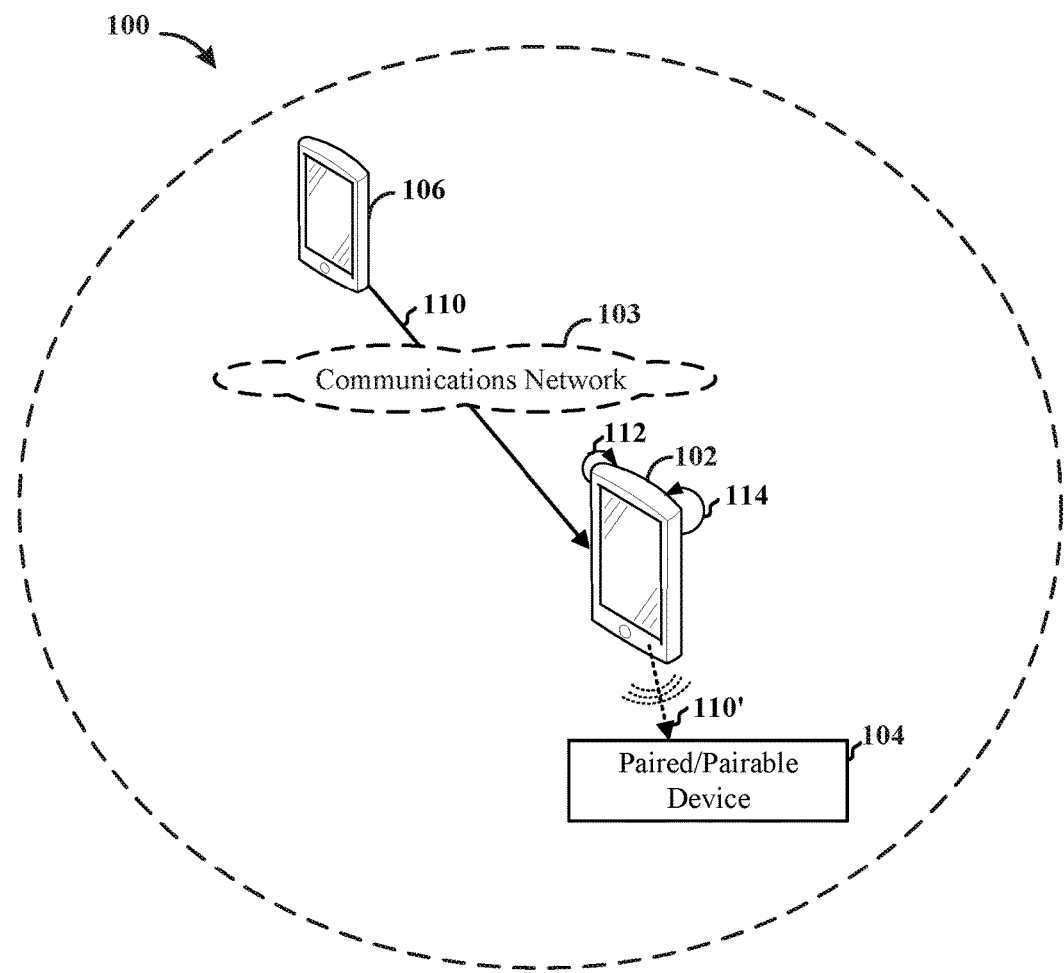
FIG. 1 illustrates an exemplary communication system including a plurality of devices implemented in accordance with an exemplary configuration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of mobile devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Various aspects of the systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, the aspects are provided so that the disclosure will be thorough and complete, and will fully convey the scope of the disclosure to those skilled in the art. Based on the teachings herein one skilled in the art should appreciate that the scope of the disclosure is intended to cover any aspect of the systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of the particular aspects fall within the scope of the disclosure. Although some benefits and advantages of the aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the aspects. The detailed description and drawings are merely illustrative of the disclosure rather than limiting, the scope of the disclosure being defined by the appended claims and equivalents thereof.

The term "associate," or "association," or any variant thereof should be given the broadest meaning possible within the context of the present disclosure. By way of example, when a first apparatus associates with a second apparatus, the two apparatuses may be directly associated or intermediate apparatuses may be present. For purposes of brevity, the process for establishing an association between two apparatuses will be described using a handshake protocol that uses an "association request" by one of the apparatus followed by an "association response" by the other apparatus. It will be understood by those skilled in the art that the handshake protocol may use other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements may be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

FIG. 1 shows an exemplary communication system 100 in which aspects of the present disclosure may be employed. The system 100 may have a plurality of communication devices including a first device 102, a second device 104 and a third device 106. Each of the devices 102 and 106 may be a UE such as a smart phone, a tablet, a laptop computer, a personal computer, or the like. The first device 102 may be, or can be, communicatively paired, e.g., tethered, with the second device 104 (also referred to as the pairing/pairable device). The second device 104 may be one of numerous different types of pairable devices, e.g., devices which can be communicatively connected to another communication device (such as the first device 102) allowing communication between the two devices using a variety of communication protocols such as a WLAN protocol, Bluetooth, Near-field communication (NFC), WiFi-Direct, or a wired communication protocol. Thus, upon pairing, the first device 102 and the second device 104 can communicate, e.g., exchange and/or forward information, with/between each other over any of the above mentioned communication protocols or other similar communication protocols. For example, the first device 102 may forward a received communication (e.g., a received call, text message, e-mail, voicemail, etc.) and/or an alert/notification corresponding to such received communication to the paired device 104. The first device 102 may be considered the master or the primary device which may control pairing with the second device 104 and routing of information from the first device 102 to the second device 104, e.g., the paired device. In some, but not all configurations, while the first device 102 is capable of receiving communication services, e.g., voice, text, data services etc., from a service provider, the second device 104 may have limited functionality in comparison to the first device and may not be able to obtain such services directly from the service provider. In some other configurations the second device 104 may have the same or similar functionalities and/or communication capabilities as the first device 102. The second device 104 may be a device already paired or which can be paired with the first device 102. In some embodiments, the second device 104 may be one of a wearable pairing device, a car infotainment unit, a home entertainment unit, or a business conferencing unit. In some embodiments, the second device 104 may be tablet device, a laptop, personal computer or other such device that can be paired with the first device 102 and receive communications and/or alert/notifications corresponding to received communications from the first device 102.

In accordance with an aspect, the system 100 may allow selective forwarding/blocking of communications and/or alert/notifications corresponding to the communications (e.g., communications received at the first device 102) from the first device 102 to the second device 104. In various configurations, the selective forwarding/blocking may be performed in accordance with user configured settings as discussed later. The alerts/notifications may be notifications indicating an incoming or received communication, e.g., a voice call, a video call, a text message, an e-mail, a voicemail, etc.). For example, an alert corresponding to an incoming voice/video call may include a picture (if available), name, and number of the caller. Similarly, an alert corresponding to an incoming text message may include a visual notification, e.g., in the form of a text message symbol and may further include a name and/or number and/or picture of the sender. When the communication is a text/chat message, e-mail, or a Facebook message, the alert/notification corresponding to such communications may further include a preview of the received text/chat message and/or e-mail, e.g., where the preview of the communications includes the content of the received communication displayed for a short duration before disappearing. An alert corresponding to a communication may also be a voice notification/announcement of the incoming or received communication. Many other types of visual and/or voice alerts/notification are possible. While such alerts/notifications may be output, e.g., displayed, on the first device 102, in accordance with one aspect, the alerts/notifications may be blocked from being forwarded to the second (paired) device 104 based on the first device user's privacy settings.

In the scenario illustrated in FIG. 1, the first device 102 receives a communication 110 from a third device 106, which may be another UE. The communication 110 from the third device 106 may be received over a communications network 103, which may include a network of a service provider and/or the internet. The second device 104 may be already paired with the first device 102, e.g., at the time when the communication 110 (e.g., call, text message, e-mail, multimedia content, etc.) is received at the first device 102. Alternatively, the second device may be paired while the communication 110 is ongoing at the first device 102.

In one configuration, upon receiving the communication 110, the first device 102 determines (112), whether the communication 110 is from a contact associated with a restricted group. For example, in some configurations the first device 102 may include a plurality of contacts stored in the first device 102, e.g., in a contacts book. In accordance with an aspect, a user of the first device 102 may create restricted groups and may include and/or associate one or more contacts from the contact book with a restricted group. The restricted groups are restricted in the sense that alert/notifications for communications (e.g., notifications corresponding to incoming calls, received messages, emails, etc.) and/or the communications from the members of the restricted groups, may be restricted from being forwarded from the first device 102 to the second device 104, e.g., the paired device, in some configurations. In some configurations, the restriction may apply to one or more types of communications from a member of the restricted group. For example, the user may create a restricted group and associate contacts A and B with the restricted group, and may configure settings for contact A such that alerts/notifications corresponding to all communications from A are blocked from being forwarded to the paired device 104, while settings for contact B may be configured such that alerts/notifications corresponding to only voice calls from B are blocked from being forwarded while alerts/notifications corresponding to other types of communication such as a text message, an email, etc. are forwarded to the paired device 104.

Figure 3:
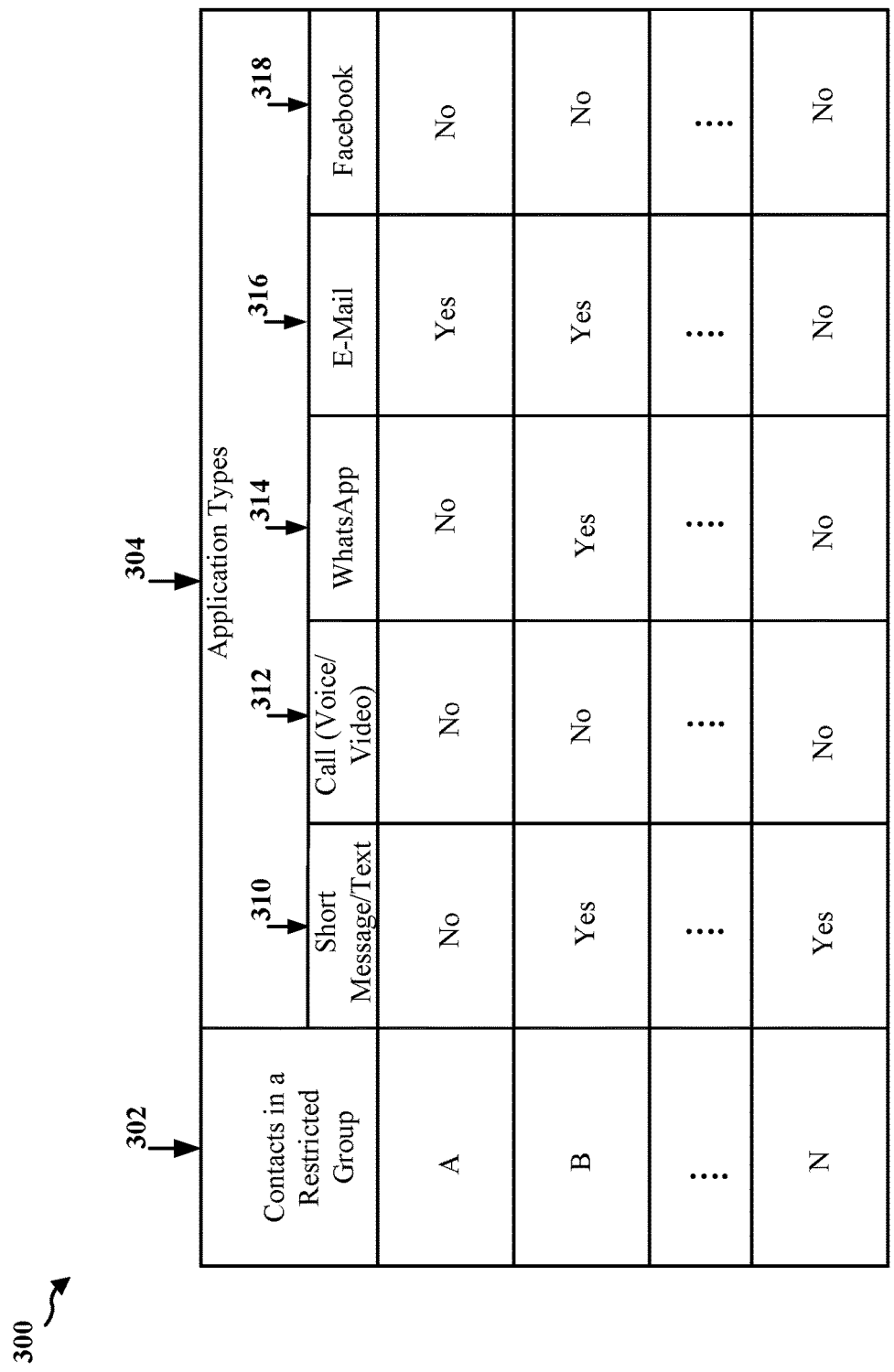
FIG. 3 illustrates information including user configured settings for controlling selective forwarding/blocking of alerts/notifications corresponding to communications from contacts of a restricted group, to a paired device, in accordance with one exemplary embodiment.
Figure 4:
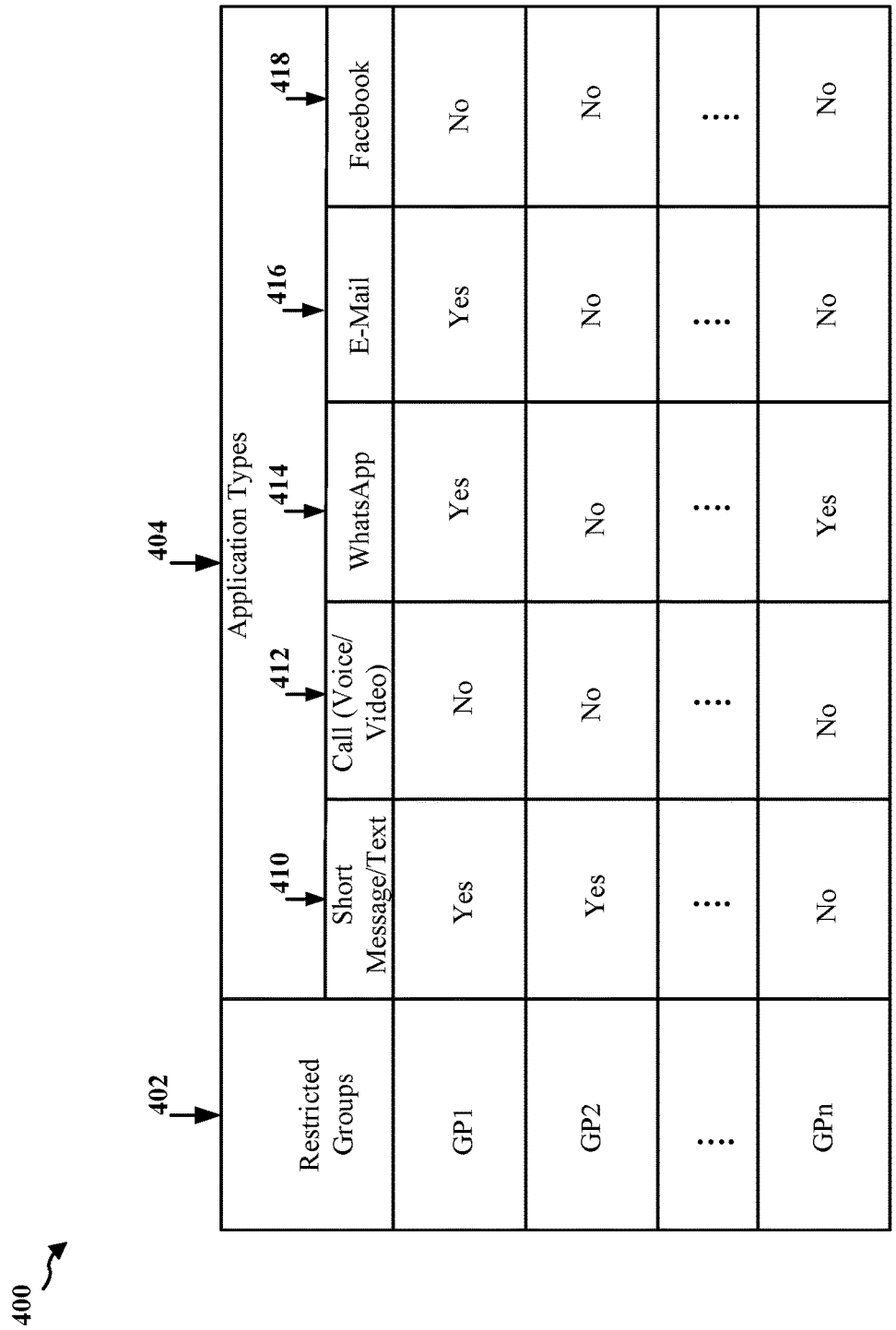
FIG. 4 illustrates information including user configured settings for controlling selective forwarding/blocking of alerts/notifications corresponding to communications from restricted groups, to a paired device, in accordance with one exemplary embodiment.

The user of the first device 102, who may be the creator of a restricted group, may configure settings of the restricted group in accordance with the user's preference and/or desire for privacy. For instance, in the above example of the restricted group including contacts A and B, the user may configure the settings for each member of the group individually or may configure the settings for all group members on a group basis. That is, in some configurations the user may define settings that indicate, on a per member/contact basis, whether an alert/notification corresponding to communication from a given contact within the restricted group should be forwarded or blocked from being forwarded to the second device 104. In some other configurations, the user may define settings that indicate, on a per group basis (e.g., the settings of the group may apply to all members of the group) whether an alert/notification corresponding to a communication from any/all members of the group should be blocked from being forwarded to the second device 104. In some configurations, a further granularity in terms of application type may be provided. For example, for each contact of a restricted group, the user may specify that a notification for a communication corresponding to a certain type of application is restricted from being forwarded to the paired device 104. Each type of application may be separately configured. The various different types of applications may include, e.g., a voice/video call application, a short message service (SMS) application, an E-mail application, and other various social media applications providing call, text, chat, feed, and/or comment posting type services such as Facebook, WhatsApp, Skype etc. Exemplary data structures (which may be stored in the first device 102 or external to the first device 102) including user configured settings for controlling selective forwarding/blocking of alerts corresponding to communications from contacts of a restricted group to a paired device according to an aspect are illustrated in FIGS. 3-4 and will be discussed in detail later. While the term restricted group is used in the discussion herein and a restricted group may have a plurality of contacts which may be referred to as restricted contacts, it should be appreciated that restricted group may even include a single contact, e.g., just one restricted contact, and need not necessarily include multiple contacts.

Continuing with the example illustrated in FIG. 1, if the first device 102 determines (112), that the communication 110 is not from a contact associated with a restricted group, an alert corresponding to communication 110 may be forwarded (shown as 110') to the paired device 104. However, if the first device 102 determines (112), that the communication 110 is from a contact associated with a restricted group, in some configurations the first device 102 performs (112) one of: blocking an alert corresponding to the communication 110 from being forwarded to the paired device, or forwarding the alert corresponding to communication 110 to the second device, e.g., in accordance with the configured settings for the restricted contact from which the communication 110 is received. For example, the first device 102 may access settings (e.g., stored in the first device 102) corresponding to the contact (e.g., user) associated with the third device 106 to determine whether an alert/notification corresponding to the received communication 110 is to be blocked from being forwarded to the second device. If the settings indicate that alerts corresponding to all communications from the contact are to be blocked, then the first device 102 blocks an alert/notification for the communication 110 from being forwarded to the second device 104, while allowing the alert/notification to be output, e.g., displayed or announced, on the first device 102. If the received communication 110 is an ongoing communication, e.g., an ongoing phone call which may have started prior to the first device 102 being paired with the second device 104, the same settings configured for selective blocking/forwarding of alerts, may be applied to the on-going communication to determine whether the ongoing communication should be transparently forwarded to the second device 104 or be blocked, e.g., to protect privacy. In the case of an ongoing communication, in some configurations, upon blocking the forwarding of the ongoing communication, the first device 102 may present an indication, e.g., a perceivable alert, on the first device 102 indicating the communication 110 is blocked from being forwarded to the second device 104 and the user may receive and/or continue the ongoing communication 110 on the first device 102. In addition, in some configurations, the first device 102 may present an option, e.g., such as a prompt on a display screen of the first device 102, to the user to override the blocking and allow the ongoing communication 110 to be forwarded to the second device 104 despite the original settings for blocking the communication. In some configurations, similar override option may be provided to override blocking of the alerts/notifications corresponding to the received communication from being forwarded to the second device 104.

In some cases, depending on the settings not all communications from a restricted contact, e.g., corresponding to different types of applications, may be blocked from being forwarded to the second device 104. For example, the settings for the contact corresponding to communication 110 may indicate that communications associated with a certain types of applications (apps) and/or corresponding alerts/notifications for such communications, may be restricted from being forwarded to the second device 104 paired with the first device 102. For example, the user of the first device 102 may configure the settings for the contact such that only an alert/notification for a voice/video call and/or a communication associated with (from) a voice/video call app, is to be blocked. In some such configurations, the first device 102 may determine (114) whether the communication 110 corresponds to a restricted application type upon determining that the communication 110 is from a contact associated with the restricted group. Subsequently, the first device 102 may decide, whether to forward or block the alert corresponding to the communication 110 to the second device 104, further based on whether the communication is associated with a restricted application type. For instance, in the above example, if the received communication is a SMS message and the settings indicate that an alert for a voice/video call from the contact corresponding to the received communication 110 is to be blocked, the first device 102 may forward an alert corresponding to the received SMS message to the second device 104.

A variety of processes and methods may be used for transmissions in the communication system 100 between the communication devices 102, 104 and 106. For example, signals may be sent and received between the first device 102 and the third device 106 in accordance with OFDM/OFDMA techniques or using a variety of other wireless communication techniques and protocols, e.g., CDMA techniques.

Figure 2A:
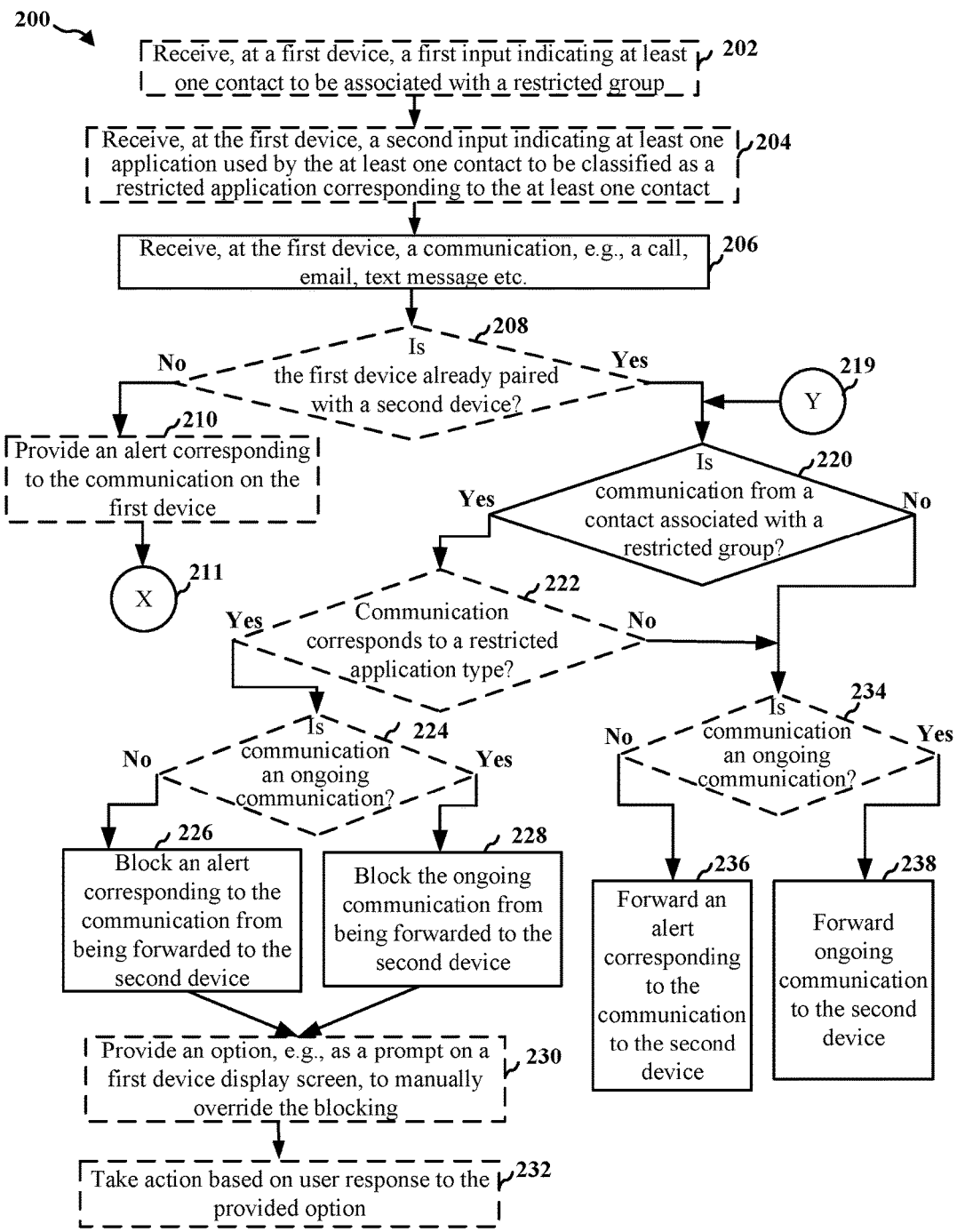
FIGS. 2A and 2B are respectively first and second parts of a flowchart of an exemplary method of operating an exemplary communication device, e.g., a first UE, in accordance with an embodiment.
Figure 2B:
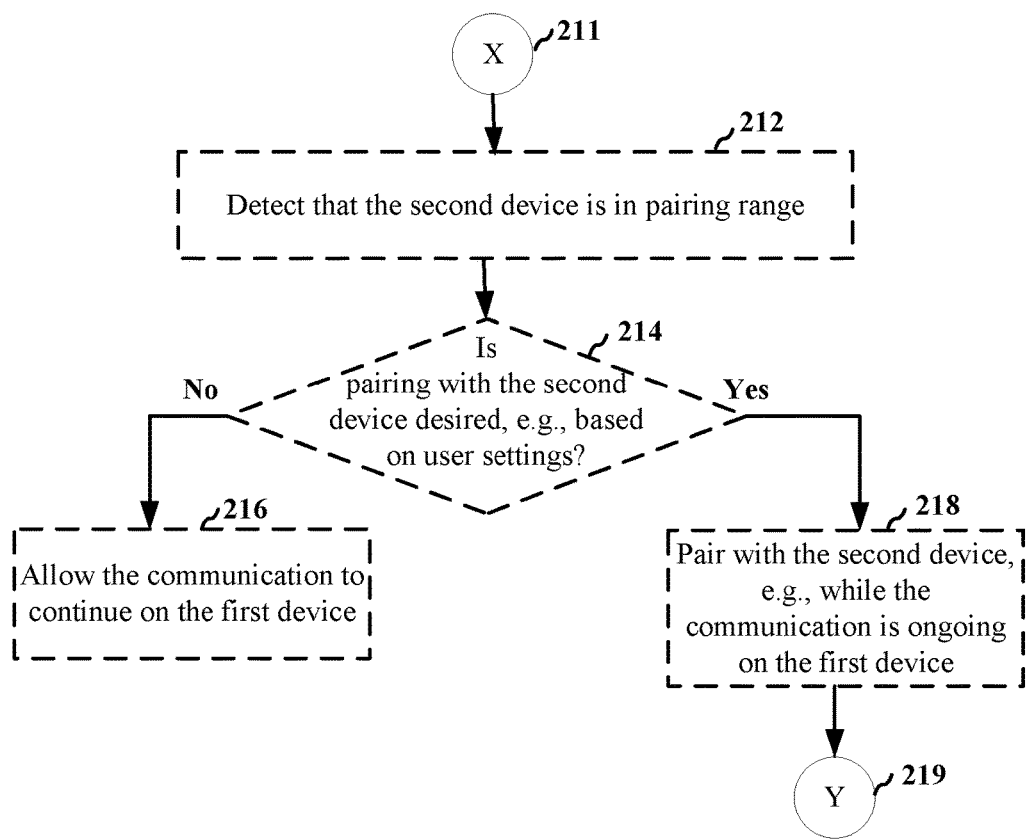

FIG. 2 illustrates a flowchart 200 of a method of wireless communication of a first device, e.g., a UE. The first device may be, e.g., the first device 102 of system 100 of FIG. 1. Some of the operations may be optional as represented by dashed/broken lines. At 202, the first device may receive a first input indicating at least one contact to be associated with a restricted group. The first input may be an input received from the user of the first device. The at least one contact being associated with the restricted group may already be stored within the first device, e.g., as a contact in a contact book, or may be a new entry being placed under the restricted group. For example, as discussed above with respect to FIG. 1, the user of the first device 102 may create a restricted group, associate one or more contacts with the restricted group, and configure settings for the one or more contacts specifying restrictions for forwarding communications from the one or more contacts to a paired device. At 204, the first device may receive a second input indicating at least one application used by the at least one contact is to be classified as a restricted application with respect to the at least one contact. The first input and the second input may be provided as part of the configuration settings for the at least one contact of the restricted group and stored in the first device as part of the configuration settings such as those illustrated in FIGS. 3-4. The user of the first device may configure the settings on a per contact basis or on a group basis. The group basis may be used when the settings are to be applied to each contact in the group. The settings may indicate, for example, whether an alert, for a communication from a given contact within the restricted group, should be forwarded or blocked from being forwarded from the first device to a second device, e.g., paired device 104. In various configurations, the at least one application to be classified as a restricted application may include one or more applications for which corresponding communication from the at least one contact and/or alert corresponding to such communication, is to be blocked from being forwarded to a paired device, e.g., second device 104. For example, after classifying a contact, e.g., contact A, as a "restricted contact" (e.g., by associating contact A with a restricted group), the user may indicate one or more restricted applications and/or restricted communication types. For instance, the user may specify that for the restricted contact A, alerts/notifications for communications from contact A corresponding to a voice call application (e.g., voice calls) and a SMS application are to be blocked from being forwarded from the first device to the paired device. Thus in this example, the voice call app and SMS app may be called the restricted application types for contact A. It should be understood that there may be a plurality of apps of a given type and the above reference to the "voice call application" and "SMS application" may refer to particular applications of the plurality of apps of the given type. For example, it should be appreciated that there may a number of voice call applications on the first device, e.g., device's default voice call app as well as one or more other available voice call apps which may be downloaded on the first device such as Tango, Viber, WhatsApp etc., which all allow voice calls, and the second input may indicate one or more specific apps when classifying the at least one application as a restricted application. Similarly, there may a number of SMS/messaging applications, e.g., the device's default SMS application which may normally be a service provider's SMS app, as well as one or more other available messaging apps such as WhatsApp, Tango and many others which provide a messaging type communication.

At some point in time during operation of the first device, the first device receives a communication as illustrated at 206. The communication may be any of a variety of different types of communications, e.g., a voice call, a video call, a text message, an e-mail, a social networking site message/mail or post, etc. For example, referring to FIG. 1, the communication may be the communication 110 received at the first device 102 from the third device 106.

Next, at 208 the first device may determine if the first device is already paired with a second device, e.g., a pairable device such as device 104. For example, with reference to FIG. 1, at the time of receiving the communication 110, the first device 102 may or may not be paired with the second device 104 and the pairing may occur, in some instances, while the communication between the first device 102 and third device 106 is ongoing. If at 208 the first device is determined to be not already paired with second device, the operation proceeds to 210 otherwise the operation proceeds to 220 as illustrated.

Upon receiving the communication and having determined that the first device is not paired with the second device, at 210, the first device may provide an alert for the received communication on the first device. Assuming the user desires to accept/open the communication, the communication may be initiated and proceed on the first device, e.g., in a normal manner. The operation proceeds to 212 via the connecting node X 211. At 212, the first device may detect that the second device is in pairing range, e.g., while the communication is ongoing on the first device. For example with reference to FIG. 1, a user of the first device 102 may receive a call while heading out of home/office and may not be paired with the second device 104 which may be, e.g., a car infotainment system with Bluetooth enabled speakers.

While the communication is ongoing, the user may reach his/her car and when within the pairing range, the first device 102 may detect that the pairable second device 104 is in range for pairing.

At 214, the first device may determine whether pairing with the second device is desired. The determination may be based on device pairing settings which may have been set by the user of the first device. For example, in the system 100 the first device 102 may be configured to automatically pair with the second device 104 whenever the second device 104 is in the pairing range. In other configurations, the pairing may be manually performed upon detecting that the second device 104 is in range and the pairing is desired. In still some other configurations, the pairing may be automatically performed for certain types of pairing devices. If at 214 pairing with the second device is not desired, then at 216 the ongoing communication may be allowed to continue on the first device. However, if at 214 pairing with the second device is desired, then at 218 the pairing with the second device may be performed, e.g., automatically in accordance with the preconfigured settings or manually in response to a user input allowing pairing. Operation proceeds from 218 to 220 (FIG. 2A) via the connecting node Y 219.

Returning to 220, as the first and second devices are paired, at 220 the first device determines whether the received communication is from a contact associated with a restricted group. For example, referring to FIG. 1, after receiving the communication 110 from the third device 106, the first device 102 determines (112) whether the communication 110 is from a contact (e.g., a user of the third device 106) associated with a restricted group. As discussed previously, the user of the first device 102 may create one or more restricted groups, associate contacts with such one or more restricted groups, and configure settings for each restricted group and/or contacts within each restricted group, to control selective blocking/forwarding of alerts/notifications, corresponding to communications from such restricted contacts, from the first device 102 to the paired device 104. For ongoing communications, the same settings may control selective blocking/forwarding of the communication itself, e.g., voice call, (rather than an alert) from the first device 102 to the paired device 104. In various configurations, information regarding the one or more restricted groups, contacts associated with the restricted groups, and the settings may be stored within the first device 102 or externally from where such information can be accessed by the first device 102. An exemplary table 300 including such information is illustrated in FIG. 3. The first device 102 may determine whether the received communication is from a contact associated with a restricted group in a variety of ways. For example, for a received communication, a sender's identification information included in the received communication may be compared with the information corresponding to restricted contacts (which may be stored on the first device 102). For each contact, at least some identification information such and a telephone number, an e-mail address etc., may be stored and may be associated with the contacts name. Thus, if the received communication is a phone call, the incoming call number may be compared with stored phone numbers corresponding to restricted contacts. Similarly, if the received communication is an e-mail then the sender's email address may be compared with e-mail addresses corresponding to restricted contacts. In some configurations, if at 220, it is determined that the received communication is from a contact associated with a restricted group, the operation proceeds from 220 to 222 otherwise the operation proceeds to 234.

At 222, the first device determines if the received communication corresponds to/associated with a restricted application type. As discussed earlier, in various configurations, in addition to identifying restricted contacts, the user may further specify one or more applications for which alerts/notifications corresponding to communications from restricted contacts and/or the corresponding communications (e.g., ongoing communication), are to be blocked from being forwarded to a paired device. Thus, in accordance with an aspect, a communication from a restricted contact, e.g., contact associated with a restricted group, may not necessarily be blocked from being forwarded to a paired device if the communication does not correspond to/associated with a restricted application. Rather, in accordance with as aspect of some configurations, the user may select one or more particular applications corresponding to certain types of communications, e.g., voice calls, video calls, SMS messages, instant or chat type messaging etc., for which alerts/notifications corresponding to a received communication (from a restricted contact) may be blocked from being forwarded to the paired device. For example, the user may configure the settings for a contact of a restricted group such that only alerts/notifications corresponding to communications from voice call apps are blocked from being forwarded to the paired device while alerts/notifications corresponding to communications from other types of applications such as SMS message, e-mail, etc., are forwarded. Such a selective blocking and forwarding of certain alerts corresponding to received communications to the paired device based on restricted contact and/or application type settings allows the user of the first device to filter out alerts for sensitive communications (e.g., from private/confidential contacts) and/or actual ongoing sensitive communications and thus protect the user's privacy. For better understanding and appreciation, consider an example where the user of the first device is driving in a car with business/work colleagues and the first device is paired with the car infotainment system including a display and Bluetooth speakers. Without any selective filtering of alerts for received communications based on restricted contacts and/or application type (e.g., voice call apps), the pairing will force alerts/notifications for all incoming communications to be forwarded to the car infotainment system allowing everyone in the car to see the alerts, e.g., if the alerts are visual, or hear the alerts, e.g., if the alerts are voice announcements. Similarly, for an ongoing communication such as a voice call which may have started before device pairing, the ongoing voice call will be forwarded to the paired device upon pairing and output via the Bluetooth speakers allowing others around the user to hear the ongoing conversation even though the user may not want the call to be made public. Thus, by providing control to the user to configure selective blocking of alerts/notifications corresponding to certain communications from sensitive/restricted contacts to the paired device, the user's privacy may not be violated.

Having considered the above example, if at 222 it is determined that the communication is not from a restricted application type, the operation proceeds to 234. However, if at 222, it is determined that the communication is from a restricted application type, the operation proceeds to 224. At 224, it is determined whether the communication is an ongoing communication, e.g., which may have started on the first device before pairing with the second device. If at 224 it is determined that the communication is not an ongoing communication, then at 226 an alert/notification for the communication is blocked from being forwarded to the second device. On the other hand, if it is determined that the communication is an ongoing communication, then at 228 the ongoing communication is blocked from being forwarded to the second device. In some configurations, while the communication is blocked from being forwarded to the second (paired) device in accordance with the settings, the user may be provided control to manually override blocking of the communication and/or the corresponding alert from being forwarded. Accordingly, in such configurations, at 230 an option may be provided to the user on the first device, e.g., as a prompt or message on the first device display screen and/or as another perceivable alert (e.g., voice alert, beep/tone alert, vibration alert etc.) in combination with a message displayed on the first device to manually override blocking of the communication (e.g., in case of ongoing communication) or override blocking of the alert corresponding to the received communication. In some such configurations, upon presenting such an option to override, the first device may monitor for a response from the user, e.g., for a predetermined amount of time. At 232 the first device takes an action, e.g., whether to override the blocking, based on a user response. For example, if an input indicating a user decision to override blocking is detected, the alert for the received communication may be forwarded to the paired device. In the case of ongoing communication, if the input is received, the action may include forwarding the ongoing communication to the second device upon pairing. However, if no input is detected, e.g., within a predetermined time or if the received input indicates user selection to not override the blocking, then the action includes refraining from overriding the blocking.

Referring back to 220, if at 220, it is determined that the received communication is not from a contact associated with a restricted group, the operation proceeds from 220 to 234. At 234, it is determined whether the communication is an ongoing communication. If at 234 it is determined that the communication is not an ongoing communication, then at 236 an alert/notification for the communication is forwarded to the second device. Once an alert/notification for the incoming communication is provided on the second device, then it is up to the user to proceed with the communication or reject the communication. On the other hand, if it is determined that the communication is an ongoing communication, then at 238 the ongoing communication is forwarded to the second device and the user may continue the communication, e.g., an ongoing voice call, on the second device. Also, it can be appreciated from the flowchart, particularly from the processing flow at 222, 234, 236 and 238, that based on selective blocking/forwarding settings, the first device may be configured to forward (238) an ongoing communication determined to be from a contact associated with the restricted group ("Yes" path of 220) to the paired device if the communication from the contact does not correspond to a restricted application type ("No" path of 222).

Thus, as discussed above, the method of flowchart 200 provides control to the user of the first device for filtering communications from restricted contacts and/or alerts/notifications corresponding to such communications based on user's privacy settings indicating restricted group contacts and/or restricted application types. In some configurations, the first device is a first UE and the second device is one of a wearable pairing device such as a Smartwatch capable of pairing with the first device and receiving communication from the first device using a communication protocol. Various other types of wearable pairing devices such as a wearable headset or earpiece (e.g., which may be Bluetooth capable) are possible. In some configurations, the second device may be one of a car infotainment unit which can be paired with the first UE, a home entertainment unit which can be paired with the first UE, a business conferencing which can be paired with the first UE or the like. The home entertainment unit may include, for example, a Smart TV capable of pairing with the first UE, receiving and outputting forwarded alerts for communications from the first device using a communication protocol. Many of the above described pairing devices may include a display screen, speakers and/or microphone to output a forwarded alert/notification for a received communication. For example, in a car infotainment unit and/or the home entertainment unit, a display may be included in addition to a speaker. Thus, while an ongoing voice call may be forwarded to the paired device (if settings permit) and output via the speakers, for an instant voice call, text message and/or e-mail received at the first device, a corresponding alert/notification may be forwarded and presented as a visual alert message displayed on the paired device and/or as an audible alert.

While a few examples of pairable/paired devices are provided above, it should be appreciated that many other different varieties of such devices capable of being paired with a UE are possible.

FIG. 3 illustrates an information table 300 including user configured settings for controlling selective forwarding/ blocking of alerts/notifications corresponding to communications from contacts of a restricted group to a paired device, in accordance with one exemplary embodiment. In the cases where a communication is an ongoing communication from a restricted contact, the same settings may be applied to selectively forward/block the ongoing communication (rather than the alert/notification) to the paired device. In some configurations, the information table 300 may be stored on the first device, e.g., in a memory of the first device 102 of system 100 implementing the method of flowchart 200. The first column 302 of the information table 300 includes information of contacts of a restricted group. Each entry in column 302 corresponds to a different contact corresponding to a restricted group. The second column 304 includes various types of different applications which can be classified as restricted based on the user's preference. The second column 304 includes sub-columns 310 through 318, each of which corresponds to a different application type as illustrated. For example, sub-column 310 corresponds to the short message service application which may be the service provider's messaging app, e.g., such as a SMS app provided by Verizon, T-Mobile, AT&T. Sub-column 312 corresponds to a voice/video call app, which may be the service provider's voice/video call app. Sub-column 314 corresponds to "WhatsApp" which is another popular application which may be used by many contacts in the restricted group for instant messaging (IM)/chat type messaging. Similarly, sub-column 316 corresponds to an E-mail application used by the first device and sub-column 318 corresponds to a Facebook app. While a few application types are shown in the exemplary information table 300, many additional applications corresponding to various communication types are possible. While configuring the settings, the user may indicate for each of the applications, whether the application is restricted. For example, alerts/notifications for communications corresponding to a restricted application is blocked from being forwarded to the paired device.

To better understand how the information presented in the table 300 is implemented, consider the first entry in each of the columns 302 and 304 (including sub-columns 310 through 318) at a time. The first entry in column 302 indicates information identifying a contact, e.g., contact "A", as a member of a restricted group or simply a restricted contact. The corresponding first entry in each of the sub-columns 310 through 318, which is illustrated as either a "Yes" or "No", indicates whether an alert/notification for a communication (from contact A) corresponding to the application identified in a given column to which the given entry corresponds, is to be forwarded or blocked. For example, a "Yes" entry for an application indicates that alerts/notifications for a communication corresponding to the application should be forwarded, or in other words, the corresponding application is not restricted. A "No" indicates that alerts/notifications for the communication corresponding to the application should be blocked/not to be forwarded, or in other words the corresponding application is restricted.

Thus, as illustrated in FIG. 3, alerts/notifications for a communication from contact "A" corresponding to the SMS app, the voice/video call app, WhatsApp, and Facebook app, is to be blocked from being forwarded from the first device (e.g., device 102) to the paired device (e.g., device 104) since the settings represented in the information table 300 indicate a "No" under each of these apps. In other words, the settings corresponding to contact "A" (first entry in each of the columns 302 and 304) indicate that an alert/notification for an SMS message, a voice/video call, a WhatsApp message/call, and/or a Facebook message/post, received from contact "A", should not be forwarded to the paired device 104. In addition, from the settings for contact "A" it can be seen that alerts/notifications corresponding to the E-mail app (sub-column 316) may be forwarded to the paired device 104. That is, alert/notifications for e-mails received from contact "A" at the first device 102, may be forwarded to the paired device 104.

Next, consider the settings for the next contact by considering the second entry in each of the columns 302 and 304 (including sub-columns 310 through 318). The second entry in column 302 indicates information identifying a contact in the restricted group as contact "B". A "Yes" or No" entry in each of the sub-columns 310 through 318, indicate whether alerts/notifications for a communication (from contact B) corresponding to the application identified in the given column, is to be forwarded or blocked. Thus, the settings for contact "B" indicate that notifications for a voice/video call and/or a Facebook message/post received from contact "B", should not be forwarded to the paired device 104, while notifications for SMS messages, WhatsApp messages, and/or an e-mails received at the first device 102 from contact "B" may be forwarded to the paired device 104.

Finally, the settings for the last contact identified in the information table 300 may be analyzed in a similar manner. Consider the last entry in each of the sub-columns 310 through 318, which correspond to contact "N". The last entry in the first column 302 indicates information identifying the last contact in the restricted group as contact "N". As can be appreciated from the information table 300, the settings for contact "N" are such that alerts/notifications only for SMS messages from contact "N" may be forwarded to the paired device 104, while alerts for all other communications corresponding to the various different identified apps should be blocked from being forwarded to the paired device 104.

It should be appreciated that the notations "A", "B", and "N" in FIG. 3 are used to simplify the illustration and the above discussion, and may indicate a contact's name (optional), a number associated with the contact (e.g., phone number), e-mail address, or some other identifier corresponding to the contact represented by the notation A, B, and N. The settings shown in the information table 300 (and information 400 discussed below) may be changed by the user at any time as desired.

FIG. 4 illustrates an information table 400 including user configured settings for controlling selective forwarding/blocking of alerts/notifications corresponding to communications from various restricted groups, to a paired device. The information table 400 is similar to information table 300, but illustrates a case where the settings are configured on a per group basis rather than a per contact basis. That is, settings for a given restricted group apply to all members/contacts associated with the restricted group. However, settings for each group may be configured differently, as desired. For example, for one restricted group, it may be desired to allow notifications for all communications except voice/video calls (from all members/contacts associated with the group) from being forwarded to the paired device 104, but for another restricted group it may be desired to block notifications corresponding to SMS messages, voice/video calls, and WhatsApp messages/calls. While each restricted group may include one or more contacts, for simplicity, individual contacts within the group are not shown in the information table 400. In some configurations, the information table 400 including the settings may be stored on the first device, e.g., in a memory of the first device 102 of system 100 implementing the method of flowchart 200. In the cases where a received communication is an ongoing communication from a restricted contact, the same settings may apply for controlling selective forwarding/blocking of the ongoing communication to the paired device.

The information presented in the information table 400 is similar to that discussed with regard to information table 300 of FIG. 3 above, but with the exception that the control settings in information table 400 are defined on a per restricted group basis rather than on a per restricted contact basis. Consider the first entry in each of the columns 402 and 404 (including sub-columns 410 through 418) at a time. The first entry in column 402 indicates information identifying a first restricted group, e.g., "GP1". The corresponding first entry in each of the sub-columns 410 through 418, which is illustrated as either a "Yes" or "No", indicates whether an alert/notification for a communication (from any contact associated with group "GP1") corresponding to the application identified in a given column to which the given entry corresponds, is to be forwarded or blocked. As illustrated, an alert/notification for a communication (from any member contact of the restricted group "GP1") corresponding to the voice/video call app and Facebook app is not to be forwarded to the paired device 104 since the settings represented in the information table 400 indicate a "No" under each of these apps. However, an alert/notification for a communication (from any member contact of the restricted group "GP1") corresponding to the SMS app, WhatsApp, E-mail app, may be forwarded to the paired device 104. In other words, the settings for "GP1" (which apply to all contacts associated with GP1) are such that alerts/notifications for SMS messages, a WhatsApp messages, and e-mails are forwarded to the paired device 104 while alerts/notifications for voice/video calls and Facebook messages/posts are blocked from being forwarded from the first device 102 to the paired device 104.

Similarly, the settings for group "GP2" (second entries in column 402 and sub-columns 410 through 418) indicate that alerts/notifications for only SMS messages (from any member of the restricted group "GP2") may be forwarded while alerts/notifications for communications such as voice/video calls, Facebook messages/posts, WhatsApp messages/calls, and e-mails, should not be forwarded to the paired device 104. Similar settings for a plurality of additional restricted groups may be included in the information table 400. Finally, the settings for the last restricted group "GPn" in the information table 400 indicate that only alerts/notifications for WhatsApp messages/calls from any contact associated with the restricted group "GPn" may be forwarded to the paired device 104 while alerts/notifications for all other types of communications corresponding to the various different identified apps should be blocked from being forwarded to the paired device 104.

Figure 5:
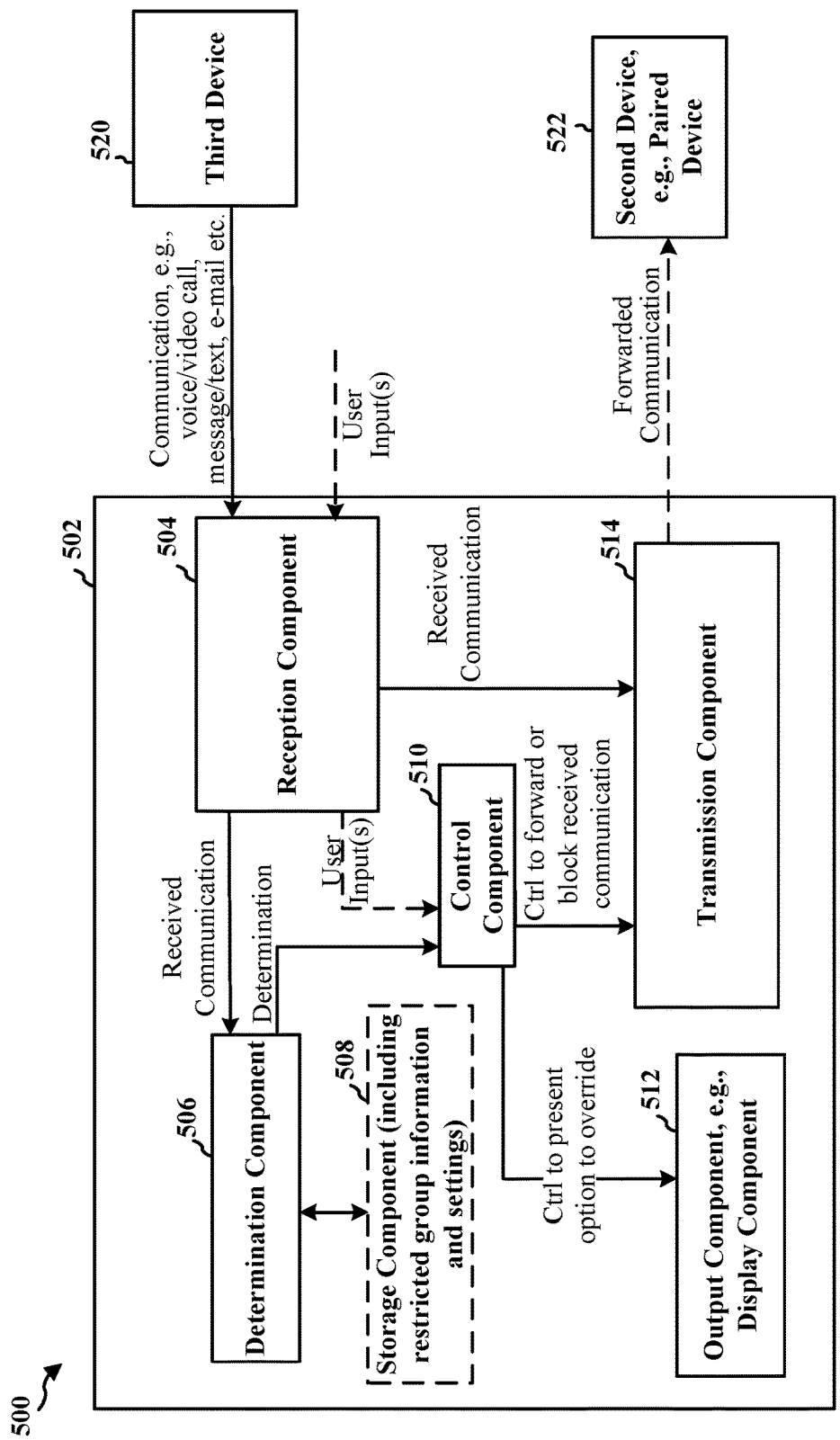
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. The apparatus may be a first UE, e.g., such as the first device 102 of FIG. 1 which may implement the method of flowchart 200. The apparatus 502 may include a reception component 504, a determination component 506, a storage component 508, a control component 510, an output component 512, and a transmission component 514.

The reception component 504 may be configured to receive and process communications, e.g., data corresponding to voice/video calls, messages, IMs, e-mails, etc. from other devices such as a third device 520 and/or other devices. For example, the reception component 504 may be configured to receive a communication, e.g., such as a voice/video call, message/text, e-mail etc., from the third device 520. For example with reference to FIG. 1, the apparatus 502 may be the first device 102 and the reception component 504 may receive communication 110 from the third device 106. In some configurations, the reception component 504 may include a user interface for receiving a user input. For example, the reception component 504 may receive a first input, e.g., from the user, indicating at least one contact, e.g., stored within the apparatus 502, to be associated with a restricted group. In some configurations the reception component 504 may receive another input indicating at least one application used by the at least one contact to be classified as a restricted application corresponding to the at least one contact. In some configurations, the reception component may be further configured to receive a user input indicating a user decision to manually override the blocking of an alert/notification for a communication from being forwarded to the second device 522, or override the forwarding of an alert corresponding to a communication to the second device 522. In case of ongoing communication, blocking or forwarding of the ongoing communication may be overridden by the user input in a similar way. In some other configurations, the user interface may be implemented as a separate component as part of the output component 512, e.g., as part of a touch screen display device. In some such configurations, user input(s) received via the user interface are provided to the control component 510 for further processing and/or action. In some configurations, the second device 522 is one of a wearable pairing device, a car infotainment unit, a home entertainment unit, or a business conferencing unit, which can be paired with the apparatus 502. The second device 522 may be paired with the apparatus 502 using a wired or wireless communication protocol.

The determination component 506 may be configured to determine whether a received communication is from a restricted contacted, e.g., contact associated with a restricted group. The determination component 506 may perform the determination based on information regarding one or more restricted groups and/or restricted contacts which may be stored in the storage component 508 or externally in an external database. In some configurations the information regarding one or more restricted groups, contacts associated with such one or more groups, and settings for forwarding/blocking alert corresponding to communications from the restricted group contacts to a paired device, e.g., second device 522, may be stored in the storage component 508 which may be accessed by the determination component 506. A few examples of such information are illustrated in the information tables 300 and 400 (which may be stored in the storage component 508) of FIGS. 3-4 and discussed above in detail. In some configurations, the determination component 506 may be further configured to determine whether the received communication corresponds to a restricted application type upon determining that the received communication is from a contact associated with a restricted group. In various configurations, the determination component 506 may provide the result of the determination, e.g., whether the received communication is from a contact associated with a restricted group and/or whether the received communication corresponds to a restricted application type, to the control component 510. For example, as discussed with respect to the determination operation at 220 and 222, the determination component 506 may perform the determination, e.g., by comparing a sender's identification information included in the received communication with stored information corresponding to restricted contacts. For example, for a received phone call, caller's phone number may be compared with stored phone numbers corresponding to restricted contacts, for a received e-mail the sender's email address may be compared with e-mail addresses corresponding to restricted contacts, and so on. In various configurations, contacts the stored contacts may also include contacts Similarly, if a contact has a Facebook account, then identification information for the contact's Facebook account, e.g., Facebook account identity, may also be included as part of the stored identification information for the contact in addition to phone number, e-mail etc. Thus, an incoming Facebook message/post from a sender may also be easily recognized whether or not the message is from a restricted contact based on a comparison with the identification information for restricted contacts/groups stored along with the settings as in information tables 300/400. As previously discussed, such contact identification information may be included in column 302 of information table 300 (or 402 of information table 400). The determination component 506 may further identify, for a received communication, an application associated with the received communication. Then based on the information in tables 300/400, the determination component 506 may determine whether for a given contact from which the communication is received, if the identified application is classified as a restricted application.

The control component 510 may be configured to control the apparatus 502 (or the transmission component 514 in particular) to perform one of: blocking an alert/notification corresponding to the communication from being forwarded to the second device 522, or forwarding the alert/notification corresponding to the communication to the second device 522, based on the result of the determination performed by the determination component 506 discussed above. For example, in some configurations, the control component 510 may be configured to control the transmission component 514 to forward an alert/notification corresponding to the received communication to the second device 522 when the determination by the determination component 508 indicates that the received communication is not from a contact associated with a restricted group, and/or when the received communication is from a contact associated with a restricted group but does not correspond to a restricted application type. In some configurations, the control component 510 may be further configured to control the transmission component 514 to block an alert/notification corresponding to the received communication from being forwarded to the second device 522 when the determination by the determination component 508 indicates that the received communication is from a contact associated with the restricted group and/or the received communication is from a contact associated with the restricted group and corresponds to a restricted application type. In various configurations, when the communication is an ongoing communication, the control component 510 may be further configured to control the transmission component 514 to block the ongoing communication from being forwarded to the second device 522 upon determining that the ongoing communication is from the contact associated with the restricted group.

In some configurations, while the control component 510 performs one of the blocking or forwarding of the received communication based on the result of the determination performed by the determination component 506, the control component 510 may send a control signal to the output component 512 to generate and provide an option, e.g., as a message on the output component 512 or as a perceivable alert along with a notification, to manually override at least one of the blocking or the forwarding. In some configurations, the output component 512 may include, e.g., a display device and/or an audio output component. In some such configurations, the output component 512 may be configured to provide (e.g., upon receiving an instruction from the control component 510) an option, e.g., as an interactive message displayed on the display device, to a user of the apparatus 502, to manually override at least one of the blocking or the forwarding. The user's response (e.g., user input) to the presented option may be detected by the user interface which may be included in the output component 512 and/or the reception component 504. In some configurations, the control component 510 may be further configured to control pairing of the apparatus 502 with the second device 522. For example, in one scenario the apparatus 502 may not be already paired with the second device 522 while a communication session is active, e.g., apparatus 502 is in communication (for example engaged in a voice call) with the third device 520. In such a case if during the ongoing communication the apparatus 502 detects the second device 522 to be in the pairing range, then the control component 510 may determine if pairing is desired, e.g., based on preconfigured pairing settings and/or a user input. If it is determined that pairing is desired, the control component 510 may be further configured to control pairing of the apparatus 502 with the second device 522.

The transmission component 514 may be configured to generate and transmit messages and/or information to other devices such as the second device 522, e.g., the paired device, and/or other devices. In some configurations, under the control/direction of the control component 510, the transmission component 514 may be configured to transmit, e.g., forward, an alert/notification corresponding to the communication (received from the third device 520) to the second device 522 upon determining that the communication is not from a contact associated with a restricted group. In some configurations, under the control/direction of the control component 510, the transmission component 514 may be configured to forward an alert/notification corresponding to the communication to the second device 522 upon determining that the communication is from a contact associated with the restricted group but does not correspond to the restricted application type. In some configurations, under the control/direction of the control component 510, the transmission component 514 may be configured to block the alert/notification corresponding to the communication from being forwarded to the second device 522 upon determining that the communication is from a contact associated with the restricted group. In some configurations, the transmission component 514 may be configured to block the alert/notification corresponding to the communication from being forwarded to the second device 522 upon determining that the communication is from a contact associated with the restricted group and corresponds to the restricted application type. In the case where the communication is an ongoing communication, the control component 510 may be further configured to control the transmission component 514 to block the ongoing communication from being forwarded to the second device 522 upon determining that the ongoing communication is from the contact associated with the restricted group, and control the transmission component 514 to forward the ongoing communication to the second device 522 upon determining that the ongoing communication is not from the contact associated with the restricted group (or does not correspond to a restricted application type).

The apparatus may include additional components that perform each of the blocks of the algorithm in the aforementioned flowchart of FIG. 2. As such, each block in the aforementioned flowchart of FIG. 2 may be performed by a component and the apparatus 502 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
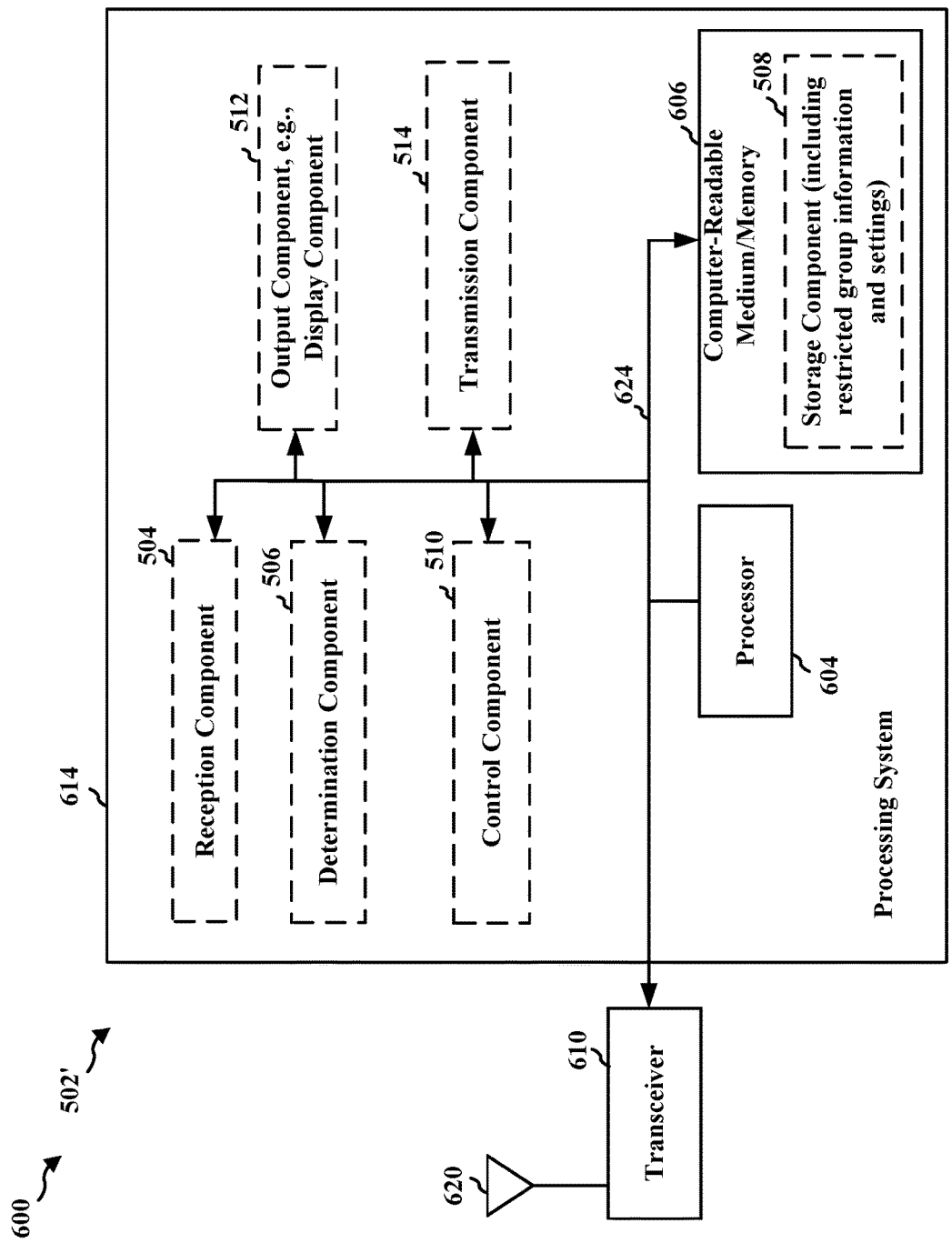
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 506, 508, 510, 512, 514, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 504. In addition, the transceiver 610 receives information from the processing system 614, specifically the transmission component 514, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. For example, the computer-readable medium/memory 606 may include restricted group information and settings such as the information tables 300 and 400. The processing system 614 further includes at least one of the components 504, 506, 508, 510, 512, and 514. The components may be software components running in the processor 604, resident/stored in the computer-readable medium/memory 606, one or more hardware components coupled to the processor 604, or some combination thereof.

In one configuration, the apparatus 502/502' may be a first device, e.g., a UE, including means for receiving a communication, e.g., voice/video call, txt message, email, etc., from another device. In some configurations, the apparatus 502/502' further comprises means for determining whether the communication is from a contact associated with a restricted group, and means for performing, based on the determining, one of: i) blocking an alert corresponding to the communication from being forwarded to a second device, or ii) forwarding the alert corresponding to the communication to the second device. In some configurations, the second device is one of a wearable pairing device, a car infotainment unit, a home entertainment unit, or a business conferencing unit, being paired with the first device.

In some configurations, the means for performing is configured to block the alert corresponding to the communication from being forwarded to the second device when the communication is from a contact associated with the restricted group, and forward the alert corresponding to the communication to the second device when the communication is not from a contact associated with a restricted group.

In some configurations, the means for determining is configured to determine whether the communication corresponds to a restricted application type upon determining that the communication is from a contact associated with the restricted group. In some configurations, the means for performing is configured to perform the one of blocking or forwarding further based on the determining whether the communication corresponds to a restricted application type. In some such configurations, the means for performing is further configured to forward the alert corresponding to the communication to the second device, when the communication is determined to be from a contact associated with the restricted group but does not correspond to the restricted application type. In some configurations, the means for performing is further configured to block the alert corresponding to the communication from being forwarded to the second device, when the communication is determined to be from a contact associated with the restricted group and corresponds to the restricted application type.

In some configurations, the apparatus 502/502' may further include means for providing an option to a user of the first device to manually override at least one of the blocking or the forwarding. In some configurations, the apparatus 502/502' may further include means for receiving a first input indicating at least one contact within the first device to be associated with the restricted group, and a second input indicating at least one application used by the at least one contact to be classified as a restricted application corresponding to the at least one contact.

In some configurations, the received communication may be an ongoing communication and the apparatus 502/502' may further include means for controlling pairing with the second device during the ongoing communication. In some such configurations, the means for performing is configured to block the ongoing communication from being forwarded to the second device when the means for determining determines that the ongoing communication is from the contact associated with the restricted group, and forward the ongoing communication to the second device when the means for determining determines that the ongoing communication is not from the contact associated with the restricted group.

The aforementioned means may be one or more of the aforementioned components of the apparatus 502 and/or the processing system 614 of the apparatus 502' configured to perform the functions recited by the aforementioned means. The processing system 614 may include a transmit processor, a receive processor, and a controller/processor. As such, in one configuration, the aforementioned means may be the transmit processor, the receive processor, and the controller/processor configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a first device, comprising:
   receiving a communication;
   determining whether the communication is from a contact associated with a restricted group; and
   performing, based on the determining, one of: i) blocking an alert corresponding to the communication from being forwarded from the first device to a second device, or ii) forwarding the alert corresponding to the communication from the first device to the second device, wherein the alert is a notification regarding the communication indicating a type of the communication and information associated with a sender of the communication;
   providing as an interactive message displayed on a display screen of the first device an option, to a user of the first device, to manually override the blocking of the alert when the first device blocks the alert based on the determining, or the forwarding of the alert when the first device determines to forward the alert based on the determining; and
   wherein the second device is a pairable device paired with the first device.

2. The method of claim 1, wherein said performing includes blocking the alert corresponding to the communication from being forwarded to the second device upon determining that the communication is from a contact associated with the restricted group.

3. The method of claim 1, wherein said performing includes forwarding the alert corresponding to the communication to the second device upon determining that the communication is not from a contact associated with a restricted group.

4. The method of claim 1, further comprising:
   determining whether the communication corresponds to a restricted application type upon determining that the communication is from a contact associated with the restricted group; and
   wherein the performing is further based on the determining whether the communication corresponds to a restricted application type, said performing including forwarding the alert corresponding to the communication to the second device upon determining that the communication is from a contact associated with the restricted group but does not correspond to the restricted application type.

5. The method of claim 1, further comprising:
   determining whether the communication corresponds to a restricted application type upon determining that the communication is from a contact associated with the restricted group; and
   wherein the performing is further based on the determining whether the communication corresponds to a restricted application type, said performing including blocking the alert corresponding to the communication from being forwarded to the second device upon determining that the communication is from a contact associated with the restricted group and corresponds to the restricted application type.

6. The method of claim 1, wherein the second device is paired with the first device using a wired or wireless communication protocol.

7. The method of claim 1, further comprising:
   receiving a first input indicating at least one contact within the first device to be associated with the restricted group;
   receiving a second input indicating at least one application used by the at least one contact to be classified as a restricted application corresponding to the at least one contact.

8. The method of claim 1, wherein the first device is a first user equipment (UE) and the second device is one of a wearable pairing device, a car infotainment unit, a home entertainment unit, or a business conferencing unit, paired with the first UE.

9. The method of claim 1, wherein the communication is an ongoing communication, the method further comprising:
   pairing with the second device during the ongoing communication; and
   determining that the ongoing communication is from the contact associated with the restricted group; and
   blocking the ongoing communication from being forwarded to the second device upon determining that the ongoing communication is from the contact associated with the restricted group.

10. The method of claim 1, wherein the information associated with a sender of the communication includes at least one of a name, a number, or a picture of a sender of the communication.

11. A first device, comprising:
means for receiving a communication;
means for determining whether the communication is from a contact associated with a restricted group; and
means for performing, based on the determining, one of: i) blocking an alert corresponding to the communication from being forwarded from the first device to a second device, or ii) forwarding the alert corresponding to the communication from the first device to the second device, wherein the alert is a notification regarding the communication indicating a type of the communication and information associated with a sender of the communication;
means for providing as an interactive message displayed on a display screen of the first device an option, to a user of the first device, to manually override the blocking of the alert when the first device blocks the alert based on the determining, or the forwarding of the alert when the first device determines to forward the alert based on the determining; and
wherein the second device is a pairable device paired with the first device.

12. The first device of claim 11, wherein the means for performing is configured to block the alert corresponding to the communication from being forwarded to the second device when the communication is from a contact associated with the restricted group.

13. The first device of claim 11, wherein the means for performing is configured to forward the alert corresponding to the communication to the second device when the communication is not from a contact associated with a restricted group.

14. The first device of claim 11,
wherein the means for determining is configured to determine whether the communication corresponds to a restricted application type upon determining that the communication is from a contact associated with the restricted group; and
wherein the means for performing is configured to perform the one of blocking or forwarding further based on the determining whether the communication corresponds to a restricted application type, the means for performing being further configured to forward the alert corresponding to the communication to the second device when the communication is from a contact associated with the restricted group but does not correspond to the restricted application type.

15. The first device of claim 11, further comprising:
wherein the means for determining is configured to determine whether the communication corresponds to a restricted application type upon determining that the communication is from a contact associated with the restricted group; and
wherein the means for performing is configured to perform the one of blocking or forwarding further based on the determining whether the communication corresponds to a restricted application type, the means for performing being further configured to block the alert corresponding to the communication from being forwarded to the second device when the communication is from a contact associated with the restricted group and corresponds to the restricted application type.

16. The first device of claim 11, further comprising:
means for receiving a first input indicating at least one contact within the first device to be associated with the restricted group, and a second input indicating at least one application used by the at least one contact to be classified as a restricted application corresponding to the at least one contact.

17. The first device of claim 11, wherein the first device is a first user equipment (UE) and the second device is one of a wearable pairing device, a car infotainment unit, a home entertainment unit, or a business conferencing unit, paired with the first UE.

18. The first device of claim 11, wherein the communication is an ongoing communication and the first device further comprises:
means for controlling pairing with the second device during the ongoing communication; and
wherein the means for performing is configured to block the ongoing communication from being forwarded to the second device when the means for determining determines that the ongoing communication is from the contact associated with the restricted group.

19. A first device, comprising:
at least one processor coupled to a memory, and configured to:
receive a communication;
determine whether the communication is from a contact associated with a restricted group; and
perform, based on the determining, one of: i) blocking an alert corresponding to the communication from being forwarded from the first device to a second device, or ii) forwarding the alert corresponding to the communication from the first device to the second device, wherein the alert is a notification regarding the communication indicating a type of the communication and information associated with a sender of the communication;
provide as an interactive message displayed on a display screen of the first device an option, to a user of the first device, to manually override the blocking of the alert when the first device blocks the alert based on the determining, or the forwarding of the alert when the first device determines to forward the alert based on the determining; and
wherein the second device is a pairable device paired with the first device.

20. The first device of claim 19, wherein the at least one processor is configured, as part of being configured to perform the one of blocking or forwarding, to block the alert corresponding to the communication from being forwarded to the second device upon determining that the communication is from a contact associated with the restricted group.

21. The first device of claim 19, wherein the at least one processor is configured, as part of being configured to perform the one of blocking or forwarding, to forward the alert corresponding to the communication to the second device upon determining that the communication is not from a contact associated with a restricted group.

22. The first device of claim 19, wherein upon determining that the communication is from a contact associated with the restricted group, the at least one processor is further configured to:
determine whether the communication corresponds to a restricted application type; and
perform the one of blocking or forwarding further based on the determining whether the communication corresponds to a restricted application type, the at least one processor being further configured to forward the alert corresponding to the communication to the second device upon determining that the communication is from a contact associated with the restricted group but does not correspond to the restricted application type.

23. The first device of claim 19, wherein upon determining that the communication is from a contact associated with the restricted group, the at least one processor is further configured to:
   determine whether the communication corresponds to a restricted application type; and
   perform the one of blocking or forwarding further based on the determining whether the communication corresponds to a restricted application type, the at least one processor being further configured to block the alert corresponding to the communication from being forwarded to the second device upon determining that the communication is from a contact associated with the restricted group and corresponds to the restricted application type.

24. The first device of claim 19, wherein the at least one processor is further configured to receive a first input indicating at least one contact within the first device to be associated with the restricted group, and a second input indicating at least one application used by the at least one contact to be classified as a restricted application corresponding to the at least one contact.

25. The first device of claim 19, wherein the first device is a first user equipment (UE) and the second device is one of a wearable pairing device, a car infotainment unit, a home entertainment unit, or a business conferencing unit, paired with the first UE.

26. The first device of claim 19, wherein the communication is an ongoing communication and wherein the at least one processor is further configured to:
   control pairing with the second device during the ongoing communication;
   determine that the ongoing communication is from the contact associated with the restricted group; and
   block the ongoing communication from being forwarded to the second device upon determining that the ongoing communication is from the contact associated with the restricted group.

27. A non-transitory computer-readable medium of a first device storing computer executable code, comprising code to:
   receive a communication;
   determine whether the communication is from a contact associated with a restricted group; and
   perform, based on the determining, one of: i) blocking an alert corresponding to the communication from being forwarded from the first device to a second device, or ii) forwarding the alert corresponding to the communication from the first device to the second device, wherein the alert is a notification regarding the communication indicating a type of the communication and information associated with a sender of the communication;
   provide as an interactive message displayed on a display screen of the first device an option, to a user of the first device, to manually override the blocking of the alert when the first device blocks the alert based on the determining, or the forwarding of the alert when the first device determines to forward the alert based on the determining; and
   wherein the second device is a pairable device paired with the first device.

\* \* \* \* \*